Patented Jan. 14, 1936

2,028,014

UNITED STATES PATENT OFFICE 2,028,014

METHOD OF TREATING HYDROCARBON FUELS

Henry Reinecke, Toronto, Ontario, Canada

No Drawing. Application May 8, 1933, Serial No. 669,939

12 Claims. (Cl. 204—31)

This invention relates to the treatment of methane and gases containing methane such for example as natural gas, which may include small quantities of ethane, propane, carbon oxide, nitrogen and water vapor.

Ordinarily such gases are transported and distributed by pipe lines which, for long distance transmission of large volumes of gas, must be of large diameter and provided with numerous booster stations. The cost of such lines is therefore so great as to make it commercially impracticable to transport natural gas from its source to any great distance.

My object therefore is to devise a method of treating and handling such fluid fuels which will enable me to effect the transportation of such fuels at a cost which will make it commercially possible to distribute them at distances many times greater than has hitherto been possible.

I attain my object by treating the methane, usually in admixture as hereinbefore referred to, by subjecting it to a process which will result mainly in the production of butane, and with modifications propane, which are hydrocarbons I find best suited for liquefaction and distribution by pipe line in a liquid condition.

The conversion of the methane into higher hydrocarbons of the methane series is effected by passing the methane through a reaction tube in which there is maintained a "silent electric" or "glow" discharge. This discharge is produced in a known manner between electrodes in the tube by means of a high tension alternating electric field of high frequency.

The methane is treated at a temperature of from 100° to 300° C. and at a pressure of about 18 mm. of mercury.

A potential of about 800 v. is required drawing about 75 milliamperes of current at a frequency of about 1000 to 1200 cycles.

The deciding factors in determining the production of the desirable methane derivatives are the rate of flow through the reaction zone which is such that the contact period of the gas molecules and the electrical field is less than .03 of a second and preferably about .02 of a second for butane, and the prompt cooling of the reaction products below the reaction temperature immediately they have left the reaction zone.

Longer contact periods may result in undesirable reactions about the compound so produced and ethylene would begin to predominate. Also recurrent reactions may occur. Higher energies in conjunction with longer contact periods would produce mainly acetylene as well as other gaseous or liquid and unsaturated compounds. So also, if the prompt cooling of the treated gas is omitted at the point when the desired reaction is effectual, other reactions are liable to go on and undesirable compounds are formed besides, or instead of butane.

Before entering the reaction tube the methane, or mixture containing methane is purified by known methods and its temperature raised to compensate for the cold produced on its entrance into the treating apparatus where low pressure is maintained, and to bring it to the optimum temperature for reaction, preferably between 100° to 300°.

On entering the zone of reaction the energy impressed upon the methane effects a decomposition of the molecules which results in the liberation of hydrogen and the formation of ethyl radicals which will combine to form butane.

As the combination between the radicals is exothermic and the heat so evolved may effect further reactions the prompt cooling of the products of the decomposition close to the point of effectual reaction is very important to prevent further reaction.

While a good production can be obtained with a one stage treatment it may be carried on in more than one stage, the gases from the first stage being re-heated before passing to the second reaction tube.

The end gases may contain some ethylene or acetylene or saturated and unsaturated hydrocarbons of even higher orders which were produced during the reaction process. They may be extracted and used in any known way. Ethylene or acetylene so produced may also be treated by suitable hydrogenation processes to bind with some of the evolved hydrogen to form ethane with subsequent treatment to form higher paraffins substantially as has been described above.

To produce propane, in either a one stage or two stage process, the process requires to be modified by reducing the contact period of e gas with the electric field below that when butane is mainly produced by the reaction. An optimum contact period would be approximately .018 of a second.

After completing the treatment the gases are compressed to effect their liquefaction, and the non-liquefiable gases, such as hydrogen, are separated out. The separated hydrogen may be utilized in any suitable manner in the production of by-products or for fuel, thereby supplying a very cheap source of energy for power or heat required in the treatment.

The enormous reduction in volume makes it possible to utilize natural gas for domestic and industrial and for gas engine purposes at places far distant from the wells by pipe line transmission.

By transforming and liquefying the hydrocarbon gases as described I so reduce the pressure required and the cross sectional area of the transmission line that long distance transmission becomes commercially practicable. For instance, a 10-inch line using 30 horse-power per mile will transport as much heat in the form of liquid hydrocarbons, as a 24-inch natural gas line at about 600 lbs. pressure using 125 horse-power per mile; or, in other words, the cost of operation will be reduced to less than one-fourth. Another advantage of my system is that an almost uniform temperature is maintained which avoids the usual extreme variations in expansion and contraction that occur in natural gas pipe lines.

The liquefied hydrocarbons may then pass to a high pressure storage tank from which the liquid is pumped to a pipe line and forced to any given distribution point. In long distance transmission pressure may drop due to frictional losses; in which case booster stations including storage tanks and pumps will be installed where necessary to maintain the pressure on the liquid hydrocarbons.

At the point of delivery the liquid hydrocarbons will be led to a suitable high pressure storage tank.

The liquefied hydrocarbons may be utilized in any known way, but usually will be regasified and distributed in the gaseous condition, with or without suitable treatment or admixture to adapt the gas for specific purposes.

The liquefied gas may, however, be transported in containers either supplemental to or in substitution for pipe line transportation. Such distribution may be made in large or small containers by rail or truck and either directly from the plant or from any convenient point in the pipe line by tapping off the liquid into the containers.

From the above it follows that the high pressure storage, the high pressure flow-regulating tanks at the booster stations, the high pressure receiving tanks at the delivery end and the connecting high pressure pipe lines between these stations represent one large pressure flow storage in which a certain minimum pressure is maintained to prevent evaporation. The motion of the fluid in this storage system is regulated by pressure heads above the necessary minimum pressure, and these heads are produced at the up-stream end during the liquefaction procedure and/or by booster pumps, and repeated at the booster stations along the line according to the varying requirements at the delivery ends of the trunk or branch lines of the system.

The method of treating and transporting hydrocarbon gases hereinbefore described possesses many advantages.

The volume of the liquefied gases is about $$\frac{1}{700}$$

of their volume in the gaseous form, and to compress a gas to this volume would require a pressure of 10.290 lbs. to the square inch, which is impracticable and unsafe for pipe line transmission or for transportation in containers by rail or by truck and on account of the prohibitive cost of construction for plant, pipes and containers.

For a perfectly working distribution system, my transportation method represents a most desirable combination, as the receiving high pressure tanks at the various distribution points have, although comparatively small, an enormous capacity. For instance, a high pressure steel sheet reinforced concrete tank of 60 feet diameter, and being 60 feet high, which can be built at small cost, and will store more than 160,000 cubic feet of liquid propane, which is equivalent to about 230,000,000 cubic feet of coal gas. The cost of construction of such an end storage plant will be only $$\frac{1}{150}$$

of what it would cost to store an equivalent amount of natural gas at the same pressure.

This enormous storage capacity solves the difficult problem of meeting peak demands in the distribution system.

Regasifying of the liquid hydrocarbons takes place automatically with reduced pressure, but should be assisted by the installation of a heating system of moderate extent in cold climates and which will be necessary in any case to compensate for the loss of heat caused by the evaporation.

An important feature of this invention is that, when methane is transformed into a higher molecular hydrocarbon, such as butane, the heat value of the butane plus that of the evolved hydrogen is greater than that of the methane before treatment. This excess of heating value will go a long way towards supplying the heat and power required for the transformation process.

Reverting to the transformation features of the process it appears that the optimum contact period for butane and propane lies between .014 and .03 of a second.

The contact period can, of course, be varied by varying the speed of flow through the reaction tube, by varying the cross sectional area of the tube, by varying the length of the electric field by varying the pressure or by varying all four.

I find that the use of much lower pressures than that hereinbefore indicated is undesirable as they make the thermal influences in the reactions insufficiently effective.

An increase in the pressure appears to retard ionization of the molecules and may require the impression of higher potentials on the gas.

The necessity of cooling the gases close to the reaction zone has been referred to above.

Both heat and cold for the reaction requirements can be made available largely from the waste heat generated during the treatment.

When hydrocarbon gases are treated by the impression of electric and thermal energies, it is a known fact that the cleavage of the molecules requires the impressing of much higher energies than the total amount of energy absorbed in the chemical equilibrium of the reaction. This unabsorbed energy prevents a stabilization of the desired compounds and gives rise to further reactions resulting in undesirable products. I find, however, that if I withdraw the excess of that unabsorbed energy close to the point of effectual reaction I can produce and stabilize the desired paraffin compounds.

It appears also that the effects of cooling close to the reaction field favors the production, as an intermediate step, of methyl radicals in the reaction zone, which condition is favorable to the production of the intermediate compound and of the radicals for the higher paraffin hydrocarbon production.

Catalytic action is not usually required, but if used the catalyst should be positioned close to the electric field, where it may favor a rapid combination of the radicals produced to effect the formation of methane derivatives.

What I claim as my invention is:

1. A method of treating methane to produce hydrocarbon gases more easily liquefied which comprises the following steps, passing the methane, at sub-atmospheric pressure, through a reaction tube; and maintaining a silent electric discharge through the gas as it passes through the tube, the rate of flow being such that the contact of the molecules of the gas and the electric field is less than .03 of a second.

2. A method of treating methane to produce hydrocarbon gases more easily liquefied which comprises the following steps, passing the methane, at a pressure approximating 18 mm. of mercury, through a reaction tube; and maintaining a silent electric discharge through the gas as it passes through the tube, the rate of flow being such that the contact of the molecules of the gas and the electric field is less than .03 of a second.

3. A method of treating methane to produce hydrocarbon gases more easily liquefied which comprises the following steps, passing the methane, at sub-atmospheric pressure, and at a temperature between 100° and 300° C., through a reaction tube; and maintaining a silent electric discharge through the gas as it passes through the tube, the rate of flow being such that the contact of the molecules of the gas and the electric field is less than .03 of a second.

4. A method of treating methane to produce hydrocarbon gases more easily liquefied which comprises the following steps, passing the methane, at sub-atmospheric pressure, and at a temperature between 100° and 300° C., through a reaction tube; maintaining a silent electric discharge through the gas as it passes through the tube, the rate of flow being such that the contact of the molecules of the gas in the electric field is less than .03 of a second; and cooling the treated gas close to the point of treatment below the lower limit of the reaction temperature.

5. A method of treating methane to produce hydrocarbon gases more easily liquefied which comprises the following steps, passing the methane, at a pressure approximating 18 mm. of mercury, through a reaction tube; maintaining a silent electric discharge through the gas as it passes through the tube, the rate of flow being such that the contact of the molecules of the gas and the electric field is less than .03 of a second; and cooling the treated gas close to the point of treatment below the lower limit of the reaction temperature.

6. A method of treating methane according to claim 1 in which the silent electric discharge is produced by an alternating electric current approximating 75 milliamperes, 800 volts and of a frequency from 1000–1200 cycles.

7. A method of treating methane to produce butane which comprises the following steps, passing methane, at sub-atmospheric pressures and at a temperature between 100° and 300° C., through a reaction tube; and maintaining a silent electric discharge through the gas as it passes through the tube, the rate of flow being such that the contact of the molecules of the gas and the electric field is approximately .02 of a second.

8. A method of treating methane to produce propane which comprises the following steps, passing methane, at sub-atmospheric pressures and at a temperature between 100° and 300° C., through a reaction tube; and maintaining a silent electric discharge through the gas as it passes through the tube, the rate of flow being such that the contact of the molecules of the gas and the electric field is approximately .018 of a second.

9. A method of treating methane to produce butane which comprises the following steps, passing methane, at sub-atmospheric pressures and at a temperature between 100° and 300° C., through a reaction tube; maintaining a silent electric discharge through the gas as it passes through the tube, the rate of flow being such that the contact of the molecules of the gas and the electric field is approximately .02 of a second; and cooling the treated gas close to the point of treatment below the lower limit of the reaction temperature.

10. A method of treating methane to produce propane which comprises the following steps, passing methane, at sub-atmospheric pressure and at a temperature between 100° and 300° C., through a reaction tube; maintaining a silent electric discharge through the gas as it passes through the tube, the rate of flow being such that the contact of the molecules of the gas and the electric field is approximately .018 of a second; and cooling the treated gas close to the point of treatment below the lower limit of the reaction temperature.

11. A method of treating methane to produce hydrocarbon gases more easily liquefied which comprises the following steps, passing the methane, at sub-atmospheric pressure, through a reaction tube; maintaining a silent electric discharge through the gas as it passes through the tube, the rate of flow being such that the contact of the molecules of the gas and the electric field is less than .03 of a second; and cooling the treated gas, close to the point of treatment, below the reaction temperature.

12. A method of treating methane to produce hydrocarbon gases more easily liquefied which comprises the following steps, passing the methane, at sub-atmospheric pressure, through a reaction tube; maintaining a silent electric discharge through the gas as it passes through the tube, the rate of flow being such that the contact of the molecules of the gas and the electric field is less than .03 of a second and the applied energy being much in excess of the total energy absorbed in the desired reaction; and withdrawing excess energy substantially at the point where the desired action is effectual.

HENRY REINECKE.